US011920773B2

(12) United States Patent
Martins

(10) Patent No.: US 11,920,773 B2
(45) Date of Patent: Mar. 5, 2024

(54) VERSATILE EMERGENCY LIGHTING LUMINAIRE FOR BUILDINGS

(71) Applicant: ABB Schweiz AG, Baden (CH)

(72) Inventor: Fabrice Martins, Saint Genis Laval (FR)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/188,860

(22) Filed: Mar. 23, 2023

(65) Prior Publication Data

US 2023/0304654 A1 Sep. 28, 2023

(30) Foreign Application Priority Data

Mar. 23, 2022 (EP) .................................... 22163747

(51) Int. Cl.
*F21V 23/06* (2006.01)
*F21S 8/02* (2006.01)
*F21V 3/00* (2015.01)
*F21V 23/00* (2015.01)
*F21Y 115/10* (2016.01)

(52) U.S. Cl.
CPC .............. *F21V 23/06* (2013.01); *F21S 8/024* (2013.01); *F21S 8/026* (2013.01); *F21V 3/00* (2013.01); *F21V 23/003* (2013.01); *F21Y 2115/10* (2016.08)

(58) Field of Classification Search
CPC .......... F21V 23/06; F21V 23/003; F21V 3/00; F21S 8/024; F21S 8/026; F21Y 2115/10
See application file for complete search history.

(56) References Cited

U.S. PATENT DOCUMENTS 10,247,373 B1 * 4/2019 Ladewig ................ F21V 21/16
10,718,498 B1 * 7/2020 Voelker .................. F21V 21/34
2004/0062055 A1 * 4/2004 Rozenberg ............... H02J 9/02
362/555

(Continued)

FOREIGN PATENT DOCUMENTS

DE 202010004778 U1 9/2011
JP 2007-123170 A 5/2007
WO WO 2020/019053 A1 1/2020

OTHER PUBLICATIONS

European Patent Office, Extended European Search Report in European Patent Application No. 22163747.3, 8 pp. (dated Sep. 19, 2022).

*Primary Examiner* — Mary Ellen Bowman
(74) *Attorney, Agent, or Firm* — Leydig, Voit & Mayer, Ltd.

(57) ABSTRACT

An emergency lighting luminaire for mounting in a recess in a wall or ceiling of a building, wherein this recess is configured to be covered with a covering plate, the luminaire comprising: a power supply unit that is configured to be mounted in the recess, the power supply unit comprising at least one power source and driver electronics for a plurality of illuminants; an illuminant unit that is configured to be held outside the recess, the illuminant unit comprising a substrate on which a plurality of illuminants are mounted; and a connector that attaches the illuminant unit to the power supply unit, contains electrical connections between the illuminants and the power supply unit, and is configured to traverse the covering plate.

14 Claims, 3 Drawing Sheets

(56) References Cited

U.S. PATENT DOCUMENTS

| | | | |
|---|---|---|---|
| 2004/0184264 | A1 | 9/2004 | Elam et al. |
| 2015/0070884 | A1 | 3/2015 | Wu |
| 2018/0195699 | A1 * | 7/2018 | Sidiropoulos ......... F21V 21/047 |
| 2018/0224596 | A1 * | 8/2018 | Creasman ................. F21V 3/00 |
| 2021/0102691 | A1 | 4/2021 | Forbis, II et al. |

* cited by examiner

VERSATILE EMERGENCY LIGHTING LUMINAIRE FOR BUILDINGS

CROSS-REFERENCE TO RELATED APPLICATIONS

This patent application claims priority to European Patent Application No. 22163747.3, filed on Mar. 23, 2022, which is incorporated herein in its entirety by reference.

FIELD OF THE DISCLOSURE

The present disclosure relates to emergency lighting inside a building during a fire, a power outage, or another calamity.

BACKGROUND OF THE INVENTION

During a fire, a power outage or another calamity in a building, the normal lighting of the building may fail, which may make orientation within the building difficult. However, both occupants and first responders need such orientation in order to safely leave the building and/or fight the calamity (such as a fire). Therefore, many buildings are required to be equipped with emergency lighting systems. An exemplary emergency lighting system is disclosed in WO 2020/019 053 A1.

Usually, the requirement is that certain floor areas must be lit with a certain minimum light intensity, to ensure sufficient orientation.

BRIEF SUMMARY OF THE INVENTION

In a general aspect, the present disclosure describes an emergency lighting luminaire that is cheap to produce and adaptable to a wide range of situations and requirements.

The disclosure describes an emergency lighting luminaire for mounting in a recess in a wall or ceiling of the building. When constructing the building, such recesses with a standard square or round shape are usually foreseen in regular intervals, e.g., along the length of a corridor. The recess is configured to be covered with a covering plate. For example, a ceiling or wall tile may be used as a covering plate. If a recess is not in use, it may then be hidden from view by the ceiling or wall tile that looks like the surrounding area of the ceiling or wall. Previous luminaires are configured to at least partially protrude from the recess. That is, the covering plate is removed from the recess such that the luminaire can protrude from it.

By contrast, according to the present disclosure, the emergency lighting luminaire is built in a modular manner that does not require removing the covering plate altogether.

The luminaire comprises a power supply unit that is configured to be mounted in the recess. This power supply unit comprises at least one power source and driver electronics for a plurality of luminaires. In particular, the power source may comprise one or more batteries, and optionally means to recharge the one or more batteries during normal operation of the building where mains power is available. The power supply unit can be mounted to the recess by any suitable means, such as screws and/or clamps. Typically, all recesses are equipped with standard fixtures for luminaires. The driver electronics takes in the voltage from the power supply and drives the luminaires with a voltage and/or current appropriate for the lighting job at hand. In particular, the driver electronics may be configured to regulate the light intensity by means of the current.

BRIEF DESCRIPTION OF THE SEVERAL VIEWS OF THE DRAWING(S)

DETAILED DESCRIPTION OF THE INVENTION

Figure 1:
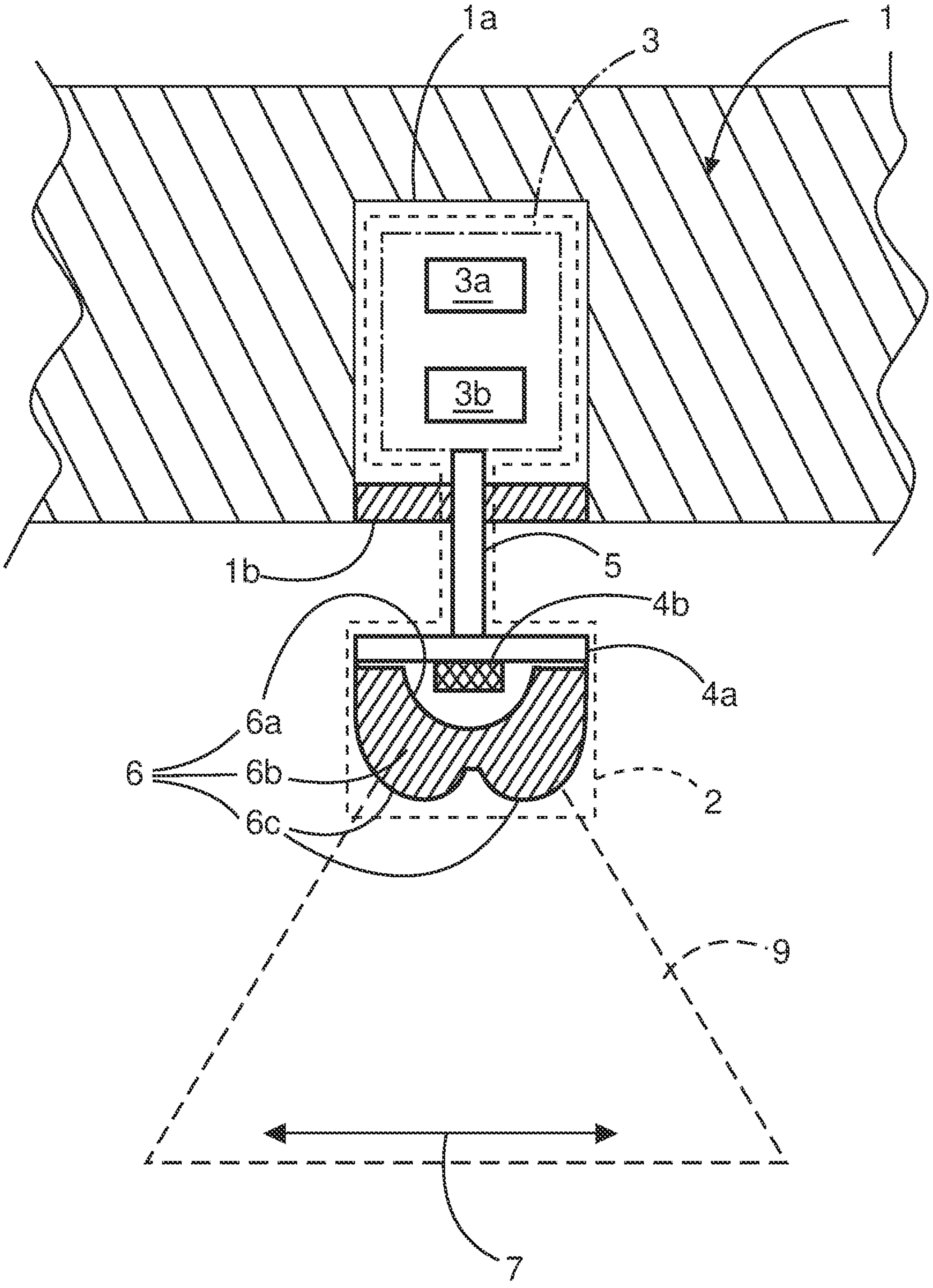
FIG. 1 is a side view of an exemplary embodiment of a luminaire mounted in a recess of a ceiling in accordance with the disclosure.

FIG. 1 shows an exemplary embodiment of the luminaire 2 in a state where it is mounted in a recess 1*a* of a ceiling 1 and serves to illuminate an area of interest 7 on a floor with light 9. FIG. 1 is not drawn to scale. The luminaire 2 comprises a power supply unit 3, a luminaire or illuminant unit 4, a transparent cover 6 mounted to the illuminant unit 4, and a connector 5 that electrically and mechanically connects the power supply unit 3 to the illuminant unit 4. The connector 5 passes through the covering plate 1*b* that covers the recess 1*a*. That is, from the bottom, apart from the presence of the transparent cover 6 and the illuminant unit 4, the ceiling 1 looks as if no luminaire 2 was present inside the recess 1*a*. Only a minimal hole has been pierced into the covering plate 1*b* to accommodate the passing through of the connector 5.

The power supply unit 3 comprises a power source 3*a* and driver electronics 3*b* that supply power to illuminants 4*b* on the substrate 4*a* of the illuminant unit 4. The power supply unit 3 is mounted in the recess 1*a* with fixation means not shown in FIG. 1.

The light from the illuminants 4*b* in the center part of the substrate 4*a* is collected by an inner surface 6*a* of the transparent cover 6, refracted by the refractive material 6*b* of the transparent cover 6, and emitted towards the area of interest 7 from an outer surface 6*c* of the transparent cover 6 as light 9. In the example shown in FIG. 1, the inner surface 6*a* has one single concave shape facing the illuminants 4*b*. The outer surface 6*c* has two convex shapes facing the area of interest 7.

Figure 2:
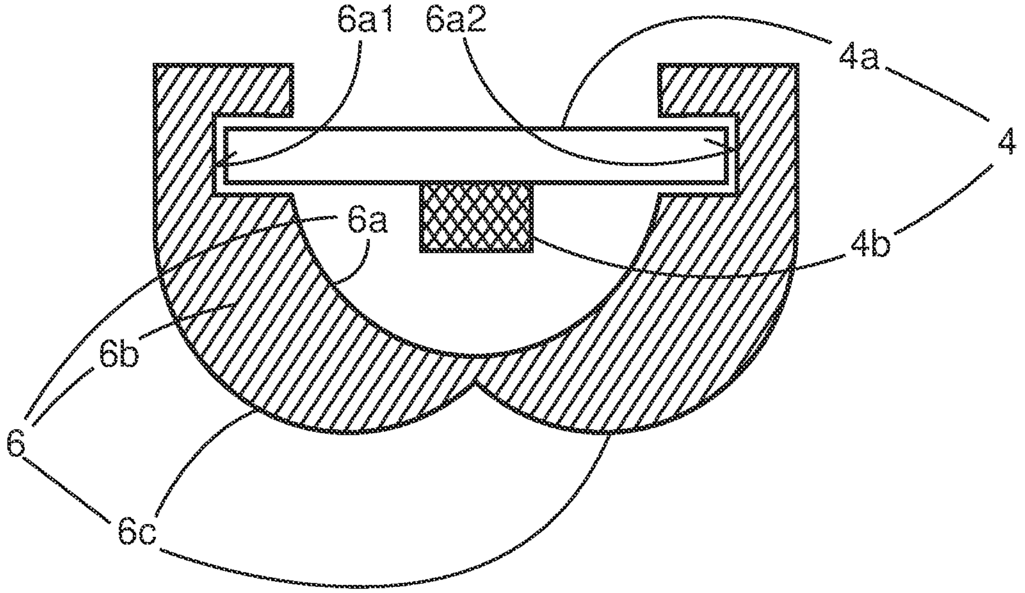
FIG. 2 is a close-up side view of a sliding of a substrate in notches of an the inner surface of a transparent cover in accordance with the disclosure.

FIG. 2 is a close-up side view of the mounting of the transparent cover 6 to the substrate 4*a* of the illuminant unit 4. FIG. 2 is not drawn to scale.

The inner surface 6*a* of the transparent cover 6 has two notches 8*a* and 8*b* in which the substrate 4*a* of the illuminant unit 4 is slidable. As discussed before, this allows to slide the transparent cover 6 over the substrate of the illuminant unit 4, so as to mount it without requiring tools.

Figure 3:
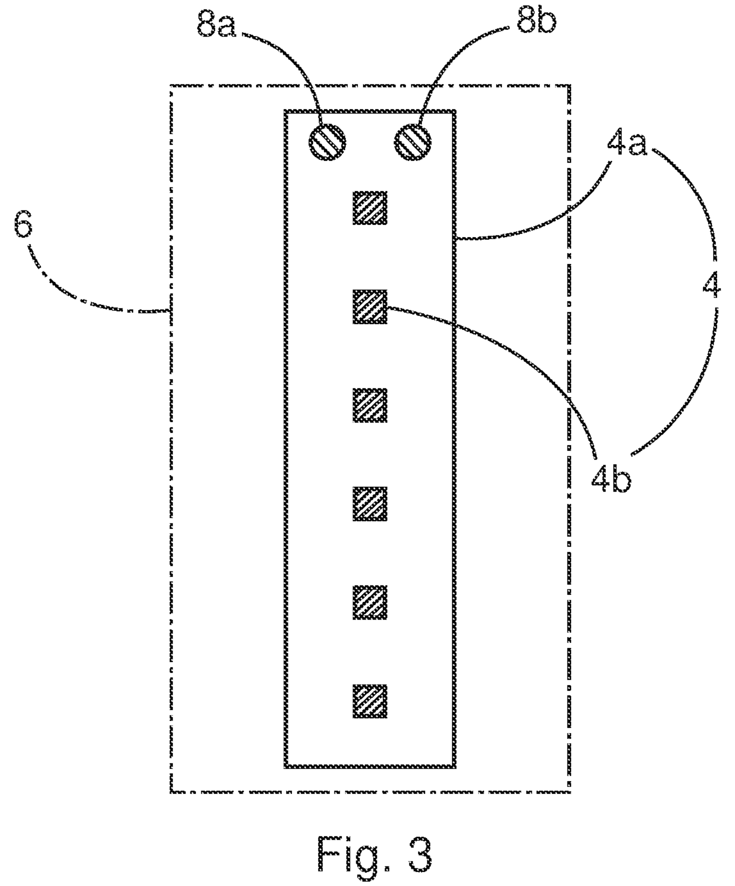
FIG. 3 is a bottom view of the illuminant unit with status indicators in accordance with the disclosure.

FIG. 3 is a bottom view of the illuminant unit 4 with multiple illuminants 4*b* on a substrate 4*a*. FIG. 3 is not drawn to scale.

Two status indicators 8*a* and 8*b* are also mounted to the substrate 4*a*. In the example shown in FIG. 3, the status indicator 8*a* is configured to show that the luminaire 2 is ready and powered, whereas the status indicator 8*b* is configured to show particular faults in the luminaire 2.

Figure 4:
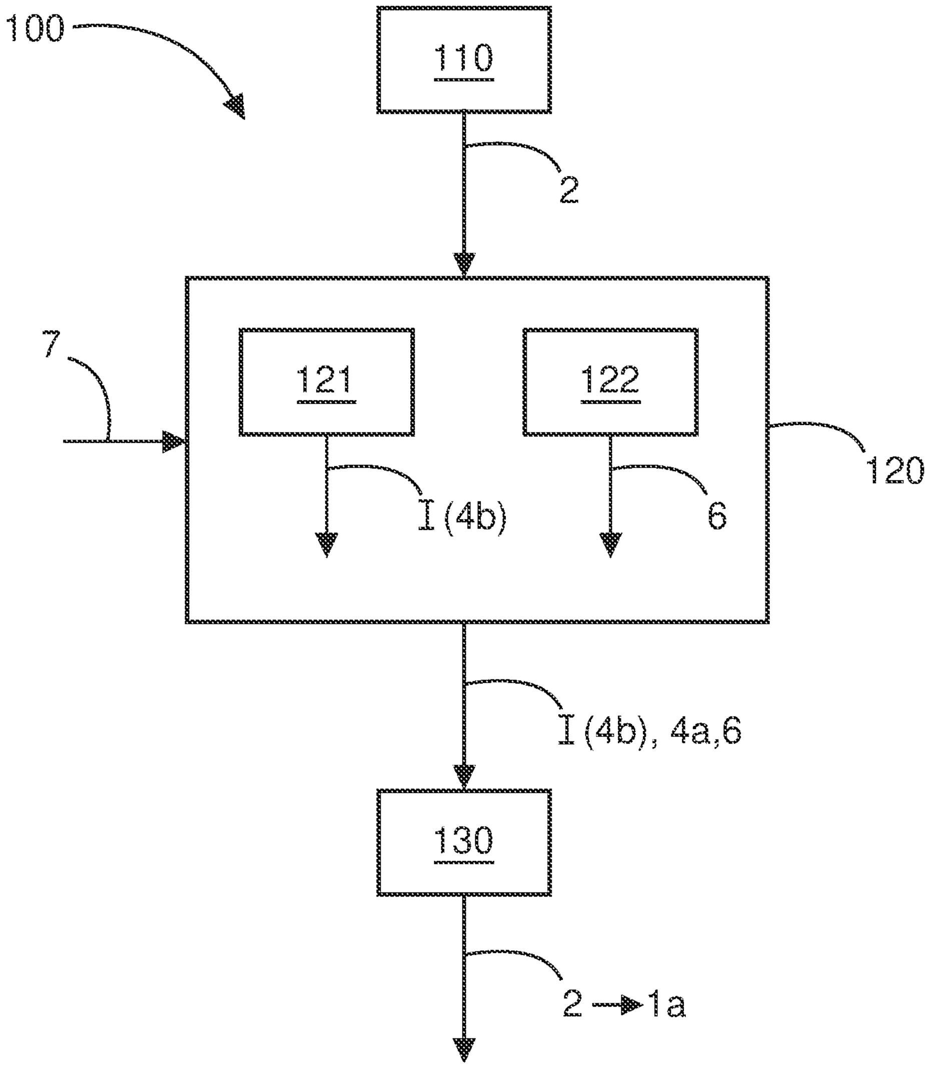
FIG. 4 is a flowchart for an exemplary embodiment of a method for configuring emergency lighting in accordance with the disclosure.

FIG. 4 is a schematic flow chart of an embodiment of the method 100 for configuring emergency lighting from at least one given recess 1*a* in a wall or ceiling 1 of a building to at least one given area of interest 7 of the building.

In step 110, at least one luminaire 2 as described above is provided.

In step 120, the light intensity produced by the luminaire on a floor in a given area of interest 7 on the floor is tuned by adapting the driving current I(4*b*) for the luminants 4*b*; and/or the shape and/or dimensions of the substrate 4*a*; and/or the shape and/or dimensions of the transparent cover 6.

In particular, according to block 121, the driving current for the illuminants 4*b* may be modified as a function of the height of the given recess 1*a* above the floor in the area of interest 7.

Alternatively, or in combination to this, according to block 122, the shape of the transparent cover 6 of the luminaire 4 may be modified to direct more of the light emitted by the illuminants (4*b*) towards at least one particular place in the area of interest 7.

The luminaire further comprises an illuminant unit that is configured to be held outside the recess. Tis illuminant unit comprises a substrate on which a plurality of illuminants is mounted. For example, the substrate may be an electronic circuit board.

The luminaire further comprises a connector that attaches the illuminant unit to the power supply unit, contains electrical connections between the illuminants and the power supply unit, and is configured to traverse the covering plate.

By separating the power supply unit from the illuminant unit, the flexibility to adapt the luminaire to the requirements of the concrete lighting situation is increased. Typically, all the recesses for luminaires have a standard format and standard fixtures that accept luminaires. But the lighting requirements may differ. For example, if a corridor widens, a larger area has to be covered with the required minimum light intensity. To adapt to this requirement, an illuminant unit with more illuminants, with more powerful illuminants, and/or with additional optics to transport the light to an area of interest, may be attached to the connector. Because the illuminant unit is held outside the recess, its dimensions are not fettered to those of the recess.

Moreover, the power supply unit and the connector can always stay the same. This means that these components can be manufactured in larger quantities, at a lower price per unit. It is also easier to install an emergency lighting system with many luminaires if one does not have to pay attention which type of power supply unit or connector to use where.

The connector may be integrated into the power supply unit, but it may also be a separate part that is attachable to the power supply unit. The latter has the advantage that the connector can have a much smaller cross section than the power supply unit. This means that only a small hole needs to be made in the covering plate to pass the connector through. That is, when the luminaire has been mounted, the covering plate can be in the same place as before. The power supply unit is thus hidden from view; only the illuminant unit is still visible. This makes the luminaire as a whole less obtrusive. But more importantly, the covering plate can still fulfil its important function as a barrier against fire and smoke. In particular, a space behind ceiling tiles or wall tiles may be a critical place with respect to fire safety. If smoke or a fire is allowed to enter that space, it may quickly spread to other parts of the building. For this reason, the connector preferably has a cross section of at most 25 $cm^2$.

In a particularly advantageous embodiment, the substrate comprises at least one elongate strip on which the illuminants are mounted in a substantially line-shaped arrangement. In this manner, the area to be lit with the luminaire may be adjusted via the length of this elongate strip. For example, the elongate strip may come in the form of segments with a few illuminants each, and in every position where a luminaire needs to be installed, as many segments as needed may be connected together. The segments may then be mass-produced, driving down the manufacturing cost even more and making installation even easier. There is no need to keep track of different illuminant units; there can be one large bucket of illuminating unit segments that supplies all members of the workforce.

In particular, the substrate may laterally extend beyond the covering plate. As mentioned before, the dimensions of the illuminant unit are not limited to the dimensions of the recess used to house the power supply unit. By extending the substrate, a larger area may be lit starting from one and the same given recess.

In a particularly advantageous embodiment, the connector is configured to be attached to the power supply unit, and/or to the illuminant unit, with releasable coupling means, such as screws, a bayonet connection, or plug and socket. This makes the installation of the luminaire easier. For example, after removing the covering plate, the power supply unit may be installed in the recess. The covering plate, such as a sheetrock ceiling tile, may be prepared with a hole to allow passage of the connector, and the connector and the covering plate may be mounted in place. Finally, the illuminant unit may be attached to the connector. Releasable coupling means make sure that this arrangement may be dismantled non-destructively again, e.g., to change the battery in the power supply unit.

In a further particularly advantageous embodiment, the luminaire further comprises a transparent cover that attaches to the substrate, accepts light emitted from the illuminants on an inner surface, alters the propagation path of the light in a refractive material, and emits the light towards an area of interest from an outer surface. In this manner, the distribution of the light intensity may be fine-tuned to produce a desired light intensity in an area of interest, even without modifying the illuminant unit.

In particular, the inner surface of the transparent cover may comprise one single shape that is concave towards the illuminants, and the outer surface of the transparent cover may comprise at least one shape that is convex towards the area of interest. For example, if light emitting diodes, LEDs, are used as illuminants, they emit light into an angle of about 120°. The transparent cover may collect this light and focus it to where it is needed.

Herein, the shape of the outer surface of the transparent cover may be asymmetric with respect to a plane that is perpendicular to a plane of the substrate and runs along a center axis of the substrate. For example, there may be only one convex shape on the outside surface of the transparent cover on one side of said plane. In this manner, the light intensity emitted into the area on the other side of said plane can be greatly reduced, and the light intensity in the area of interest may benefit from this.

In another advantageous embodiment, the transparent cover is an elongate extrusion of a two-dimensional shape. This is easy to mass-produce in any desired length. For example, the transparent cover may be fabricated in rigid segments that can be attached together to form transparent covers of arbitrary lengths. It is also possible to fabricate the transparent cover out of a flexible material that can be delivered on a spool and cut to the appropriate length at every installation site of a luminaire in the building.

In a further particularly advantageous embodiment, the inner surface of the transparent cover comprises notches into which the substrate of the illuminant unit is slidable. In this manner, the transparent cover may be mounted onto the substrate without requiring the use of tools. Also, if the spatial distribution of the light emitted from the luminaire is to be changed, the transparent cover may be changed for a new one that produces the new desired distribution of the light, in the same easy manner.

In a further advantageous embodiment, the luminaire further comprises at least one status indicator light mounted on the substrate of the illuminant unit that is configured to indicate the operating state of the luminaire. Also, a monitoring circuit is provided that is configured to drive the at least one status indicator depending on the operating state of the luminaire. In this manner, it may be checked from the floor whether the luminaire is still in working order. Because the luminaire is for use in an emergency, it will typically be off, so the fact that is off will not indicate to the building owner right away that there is a problem with the luminaire. In a simple example, the monitoring circuit may flash a status indicator light periodically to indicate that the power source is still in working order. In a more advanced example, the monitoring circuit may also check more components and periodically flash a status indicator light to indicate that everything is working or keep a status indicator light on permanently to indicate a fault. For example, it may be checked whether the electronics for switching the luminaire on in an emergency is working, or whether current is able to pass through the illuminants. If the transparent cover of the luminaire also covers the status indicator light, it can serve to make this status indicator light more visible.

As discussed before, it is a main advantage of the luminaire that it may be configured so flexibly to achieve a desired level of light intensity in a given area of interest from a given recess in a ceiling or wall. In particular, this makes it easier to configure an emergency lighting system that comprises multiple such luminaires. The invention therefore also provides a method for configuring emergency lighting from at least one given recess in a wall or ceiling of a building to at least one given area of interest of the building.

The method starts with providing at least one luminaire described above. For these one or more luminaires, the driving current for the illuminants, the shape and/or dimensions of the substrate of the luminaire, and/or the shape and/or dimensions of the transparent cover of the luminaire is adapted such that light intensity produced by the luminaire on a floor in the given area of interest meets a predetermined specification. The so-configured at least one luminaire is mounted to the at least one given recess. Herein, multiple luminaires may contribute to the light intensity in at least one area of interest on the floor. LEDs and similar sources used for illuminating space are incoherent light sources, so intensities produced by multiple luminaires in one and the same area of interest will be added to form a total intensity.

The advantage of this method is that, for the most part, same components may be used for all the luminaires. In particular, the power supply unit and the connector may be the same for all luminaires. Even an illuminating unit of varying lengths may be realized by joining varying numbers of same segments together.

In a particularly advantageous embodiment, the driving currents for the illuminants is modified as a function of the height of the given recess above the floor in the area of interest. In particular, LEDs as illuminants have a relatively wide range in which their driving currents, and hence their light intensities, may be varied. If more light intensity on the floor is needed because the luminaire is mounted higher above the floor, and this additional intensity may be provided simply by increasing the driving current, no further modification of the luminaire is necessary.

In a further advantageous embodiment, the shape of the transparent cover of the luminaire is modified to direct more of the light emitted by the illuminants towards at least one particular place in the area of interest. In this manner, the light intensity may be increased further in case no further increase in the driving current is available. Also, even if such an increase would still be available, re-routing, by means of the modified transparent cover, light that would otherwise have gone to waste towards the area of interest, so as to increase the light intensity there, has the advantage of not requiring more battery power.

LIST OF REFERENCE SIGNS

1 wall or ceiling
1*a* recess in wall or ceiling
1*b* covering plate for recess 1*a*
2 luminaire
3 power supply unit of luminaire 2
3*a* power source of power supply unit 3
3*b* driver electronics of power supply unit 3
4 illuminant unit of luminaire 2
4*a* substrate of illuminant unit 4
4*b* illuminants of illuminant unit 4
5 connector, connects power supply unit 3 and illuminant unit 4
6 transparent cover for illuminant unit 4
6*a* inner surface of transparent cover 6
6*a*1, 6*a*2 notches in inner surface 6*a*
6*b* refractive material of transparent cover 6
6*c* outer surface of transparent cover 6
7 area of interest to be illuminated
8*a*, 8*b* status indicators
9 light sent to area of interest 7
100 method for configuring emergency lighting
110 providing at least one luminaire 2
120 making adaptations for light intensity in area of interest 7
121 adapting driving current I(4*b*) for illuminants 4*b*
122 adapting shape of transparent cover 6
130 mounting configured luminaire 2 to recess 1*a*
I(4*b*) driving current for illuminants 4*b*

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An emergency lighting luminaire for mounting in a recess in a wall or ceiling of a building, wherein this recess is configured to be covered with a covering plate, the luminaire comprising:

a power supply unit that is configured to be mounted in the recess, the power supply unit comprising at least one power source and driver electronics for a plurality of illuminants;

an illuminant unit that is configured to be held outside the recess, the illuminant unit comprising a substrate on which a plurality of illuminants is mounted;

a connector that attaches the illuminant unit to the power supply unit, contains electrical connections between the illuminants and the power supply unit, and is configured to traverse the covering plate; and a transparent cover that attaches to the substrate, accepts light emitted from the illuminants on an inner surface, alters a propagation path of the light in a refractive material, and emits the light towards an area of interest from an outer surface, wherein the inner surface of the transparent cover comprises one single shape that is concave towards the illuminants, and the outer surface of the transparent cover comprises at least two shapes that are convex towards the area of interest.

2. The luminaire of claim 1, wherein the substrate comprises at least one elongate strip on which the illuminants are mounted in a substantially line-shaped arrangement.

3. The luminaire of claim 1, wherein the substrate laterally extends beyond the covering plate.

4. The luminaire of claim 1, wherein the connector is configured to be releasably coupled to the power supply unit, and/or to the illuminant unit.

5. The luminaire of claim 1, wherein the connector has a cross section of at most 25 $cm^2$.

6. The luminaire of claim 1, wherein the shape of the outer surface of the transparent cover is asymmetric with respect to a plane that is perpendicular to a plane of the substrate and runs along a center axis of the substrate.

7. The luminaire of claim 1, wherein the transparent cover is an elongate extrusion of a two-dimensional shape.

8. The luminaire of claim 1, wherein the inner surface of the transparent cover comprises notches into which the substrate of the illuminant unit is slidable.

9. The luminaire of claim 1, wherein the illuminants comprise light emitting diodes, LEDs.

10. The luminaire of claim 1, further comprising:

at least one status indicator light mounted on the substrate of the illuminant unit that is configured to indicate the operating state of the luminaire; and a monitoring circuit that is configured to drive the at least one status indicator depending on the operating state of the luminaire.

11. A method for configuring emergency lighting from at least one given recess in a wall or ceiling of a building to at least one given area of interest of the building, comprising the steps of:

providing at least one luminaire, the at least one luminaire configured for mounting in a recess in a wall or ceiling of a building, wherein the recess is configured to be covered with a covering plate, the luminaire comprising:

a power supply unit that is configured to be mounted in the recess, the power supply unit comprising at least one power source and driver electronics for a plurality of illuminants;

an illuminant unit that is configured to be held outside the recess, the illuminant unit comprising a substrate on which a plurality of illuminants is mounted; and a connector that attaches the illuminant unit to the power supply unit, contains electrical connections between the illuminants and the power supply unit, and is configured to traverse the covering plate;

adapting a driving current for the illuminants, the shape and/or dimensions of the substrate of the luminaire, and/or the shape and/or dimensions of a transparent cover of the luminaire such that light intensity produced by the luminaire on a floor in the given area of interest meets a predetermined specification, wherein an inner surface of the transparent cover comprises one single shape that is concave towards the illuminants, and an outer surface of the transparent cover comprises at least two shapes that are convex towards the area of interest; and mounting the so-configured at least one luminaire to the at least one given recess.

12. The method of claim 11, wherein the driving current for the illuminants is modified as a function of the height of the given recess above the floor in the area of interest.

13. The method of claim 11, wherein the shape of the transparent cover of the luminaire is modified to direct more of the light emitted by the illuminants towards at least one particular place in the area of interest.

14. The method of claim 13, wherein the modification of the shape of the transparent cover of the luminaire increases the light intensity produced by the luminaire without increasing the driving current.

* * * * *